United States Patent [19]
Barker et al.

[11] Patent Number: 5,780,182
[45] Date of Patent: Jul. 14, 1998

[54] PROPYLENE CARBONATE BASED ELECTROLYTE FOR LITHIUM ION ELECTROCHEMICAL CELL

[75] Inventors: Jeremy Barker; Feng Gao, both of Henderson, Nev.

[73] Assignee: Valence Technology, Inc., Henderson, Nev.

[21] Appl. No.: 742,398

[22] Filed: Nov. 4, 1996

[51] Int. Cl.$^6$ .................................................. H01M 10/40
[52] U.S. Cl. ........................ 429/197; 429/200; 29/623.1
[58] Field of Search ................................ 429/197, 200; 29/623.1

[56] References Cited

U.S. PATENT DOCUMENTS

| | | | |
|---|---|---|---|
| 5,130,211 | 7/1992 | Wilkinson et al. | 429/198 |
| 5,529,859 | 6/1996 | Shu et al. | 429/197 X |
| 5,571,635 | 11/1996 | Shu et al. | 429/197 X |

OTHER PUBLICATIONS

Aurbach, D., et al. "The Correlation Between the Surface Chemistry and the Performance of Li–Carbon Intercalation Anodes for Rechargeable Rocking–Chair Type Batteries", *J. Electrochem. Soc.*, vol. 141, No. 3, pp. 603–611, (1994) (Mar.).

Dey, A.N., et al., "The Electrochemical Decompostion of Propylene Carbonate on Graphite", *J. Electrochem. Soc.: Electrochemical Science*, vol. 117, No. 2, pp. 222–224, (1970) (Feb.).

Kuribayashi, I., et al., "Battery Characteristics with Various Carbonaceous Materials", *Journal of Power Sources*, 54, pp. 1–5 (1995) (month unknown).

Shu, Z.X., et al., "Electrochemical Intercalation of Lithium into Graphite", *J. Electrochem. Soc.*, vol. 140, No. 4, pp. 922–927 (1993) (Apr.).

Shu, Z.X., et al., "Effect of 12 Crown 4 on the Electrochemical Intercalation of Lithium into Grpahite", *J. Electrochem. Soc.*, vol. 140, No. 6, pp. L101–L103 (1993) (Jun.).

Shu, Z.X., et al., "Use of Chloroethylene Carbonate as an Electrolyte Solvent for a Lithium Ion Battery Containing a Graphitic Anode", *J. Electrochem. Soc.*, vol. 142, No. 9, pp. L161–L162 (1995) (Sep.).

Su, Z.X., et al., "Use of Chloroethylene Carbonate as an Electrolyte Solvent for a Graphite Anode in a Lithium–Ion Battery", *J. Electrochem. Soc.*, vol. 143, No. 7, pp. 2230–2235, (1996) (Jul.).

*Primary Examiner*—Stephen Kalafut
*Attorney, Agent, or Firm*—Charles Jew

[57] ABSTRACT

Non-aqueous solid electrochemical cells with improved performance can be fabricated by employing intercalation based carbon anodes comprising graphite, coke, or mixtures thereof, and an electrolyte having an electrolyte solvent formed of propylene carbonate and 4,5-dichloroethylene carbonate. The cells are particularly suited for low temperature applications.

32 Claims, 1 Drawing Sheet

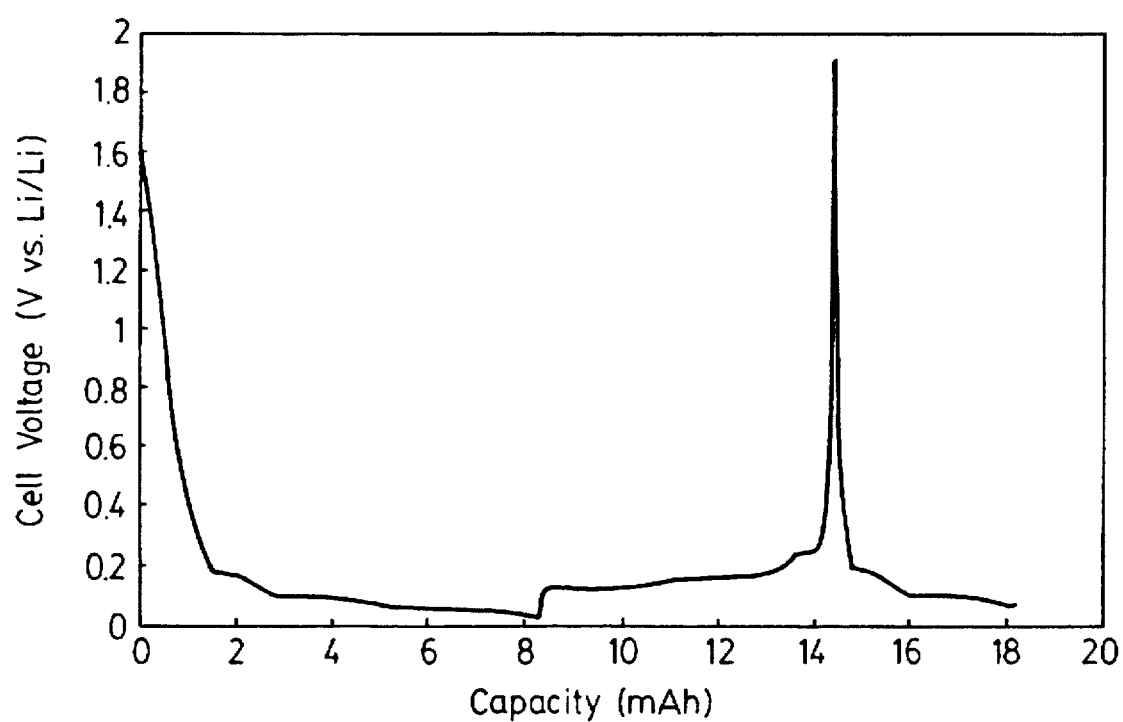
FIG._1.
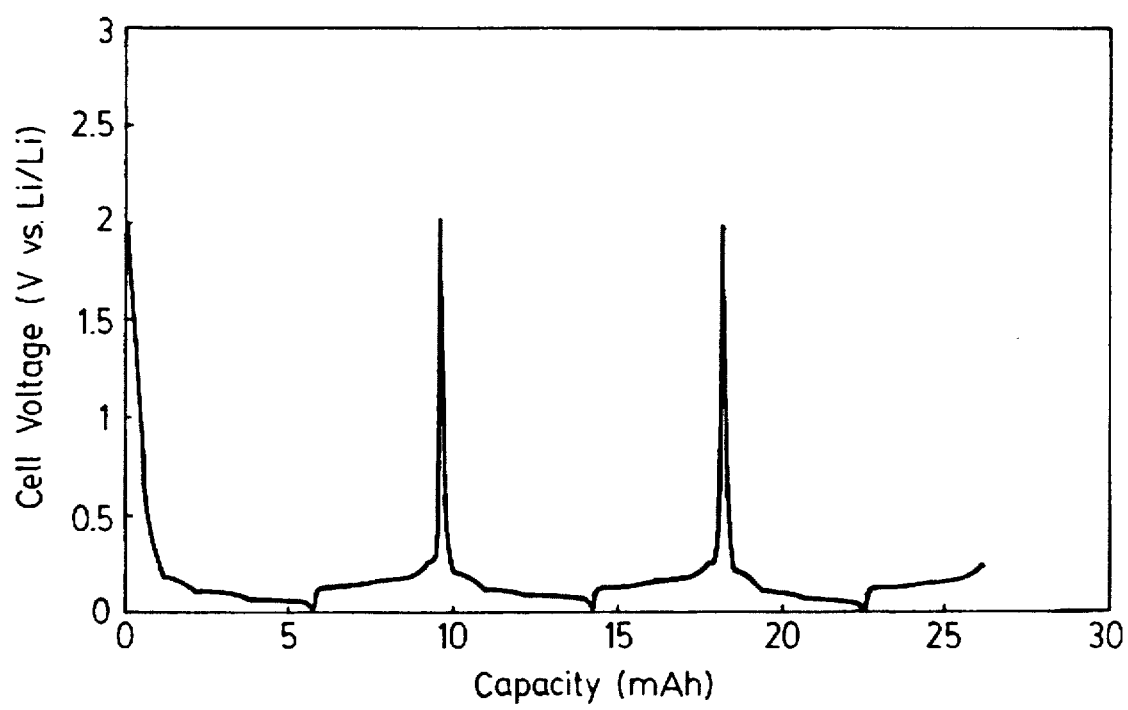
FIG._2.

PROPYLENE CARBONATE BASED ELECTROLYTE FOR LITHIUM ION ELECTROCHEMICAL CELL

FIELD OF THE INVENTION

The present invention relates to electrochemical devices and, more particularly, to non-aqueous electrochemical cells demonstrating improved performance. In particular, the electrochemical cell includes an anode comprising graphite or coke as the intercalation material and an electrolytic solvent comprising a mixture of propylene carbonate and 4,5-dichloroethylene carbonate.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Propylene carbonate (PC) is a particularly suited electrolyte solvent for non-aqueous electrochemical cells. However, PC decomposes during the first lithium intercalation into graphite anodes. The art is in search of suitable PC based solvents that avoid this problem. Conventional solvents are described for example in U.S. Pat. Nos. 5,085,952, 4,925,751, 4,908,283, 4,830,939, and 4,792,504.

SUMMARY OF THE INVENTION

The present invention is based in part to the discovery that the use of specified mixtures of propylene carbonate and 4,5-dichloroethylene carbonate in lithium ion electrochemical cells employing carbon anodes provides for cells wherein the propylene carbonate does not decompose appreciably. The cells are also suited for low temperature applications. This electrolyte solvent mixture is expected to simultaneously fulfill the requirements of high reactivity, good charge rate capabilities, acceptable life cycle, specific rate and stability. In addition, electrochemical cells will have a first cycle capacity loss of only about 10% to 35%, where the first cycle capacity loss (%)=

$$\frac{\text{(first cycle charge capacity - first cycle discharge capacity)} \times 100\%}{\text{first cycle charge capacity}}$$

In one aspect, the invention is directed to an electrochemical cell that includes:

an anode comprising a carbon anode active material comprising graphite coke, or mixture thereof and a binder;

a cathode; and an electrolyte, that is interposed between the anode and cathode, that comprises a salt and a solvent mixture comprising about a 20:80 to 80:20 weight ratio of propylene carbonate and 4,5 dichloroethylene carbonate.

In another aspect, the invention is directed to a method of fabricating an electrochemical cell that includes the steps of:

(a) providing an anode comprising a carbon anode active material comprising graphite, coke, or mixture thereof and a binder;

(b) providing a cathode; and (c) forming an electrolyte containing a salt and a solvent mixture that is interposed between said anode and said cathode wherein the solvent mixture comprising about a 20:80 to 80:20 weight ratio of propylene carbonate and 4,5 dichloroethylene carbonate.

A feature of the invention is that the solvent mixture has a melting point of less than about −30° C.

In preferred embodiments, the solvent mixture consists essentially of propylene carbonate and 4,5 dichloroethylene carbonate and/or the anode active material consists essentially graphite which has an interlayer distance spacing of 002 planes ($d_{002}$) as determined by x-ray diffraction of about 0.335 to 0.336 nm, a crystalline size in the direction of c-axis ($L_c$) being greater than about 90 nm and less than about 1000 nm, a BET surface area of grater than about 5 $m^2/g$, and up to about 25 $m^2/g$.

BRIEF DESCRIPTION OF THE DRAWINGS

FIGS. 1 and 2 display the voltage vs. capacity during charge and discharge for electrochemical half cells employing different graphite materials in the anode.

DETAILED DESCRIPTION OF THE PREFERRED EMBODIMENTS OF THE INVENTION

As noted above, this invention is directed to non-aqueous electrochemical cells which by virtue of the solvent employed provide for enhanced electrochemical performance. Although solid electrochemical cells are preferred, the invention is also applicable to liquid electrochemical cells wherein the electrolyte comprises a separator (e.g., glass fiber, polyethylene or polypropylene) and an electrolyte solution. However, prior to describing the invention in further detailed, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by supercritical fluids for example. Preferred plasticizers include, for example, dibutyl phthalate, dioctylphthalate, and acetates, glymes, and low molecular weight polymers.

In operation, for fabricating a solid polymeric matrix and composite electrode that includes polymeric binders, for example, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an electrolyte solution into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein. Suitable non-polymeric inorganic materials for use in conjunction with the solid polymeric matrix include, by way of example, $\beta$-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein.

The term "a solid matrix forming monomer" refers to inorganic or organic materials which in monomeric form can be polymerized, preferably in the presence of an inorganic ion salt, and a solvent to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283 which is incorporated herein), urethane acrylate, vinyl sulfonate polyalkylene oxides (as disclosed in U.S. Pat. No. 5,262,253, which is incorporated herein), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product may contain repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K. Lithium salts are most preferred.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate (PC), ethylene carbonate (EC), methyl ethyl carbonate, gamma-butyrolactone, triglyme, tetraglyme, dimethylsulfoxide, dioxolane, sulfolane, and the like. Solvents are described in U.S. Pat. No. 4,115,206, 4,384,115, 4,423,205, and 4,747,850, and U.S. patent application Ser. Nos. 08/630,402, filed on Apr. 10, 1996, which are incorporated herein.

For the present invention, the electrolyte solvent preferably comprises a mixture of propylene carbonate (PC) and 4,5-dichloroethylene carbonate (DCEC). Typically, the weight ratio of PC to DCEC is from about 20:80 to 80:20, preferably from about 30:70 to 70:30, and more preferably from about 35:65 to 65:35. Although the electrolytic solvent can include other co-solvents, preferably the electrolyte consists essentially of the PC/DCEC mixture. For low temperature applications, preferably the electrolytic solvent has a melting point of less than about –30° C. A preferred solvent mixture comprises about 20% to 50% PC, about 20% to 50% DCEC with the balance being EC. Preferably EC comprises about 30% in this mixture.

If desired, one or more additional organic solvents may be included in the solvent mixture. Such other organic are preferably selected from the group consisting of ethylene carbonate, methyl ethyl carbonate, diethyl carbonate, dipropyl carbonate, dimethyl carbonate, butylene carbonate, and mixtures thereof. When employed these one or more additional organic solvents preferably comprise about 5% (wt) to 50% (wt) of the electrolyte solvent mixture.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100k, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. The carbon intercalation based anode precursors typically include a polymeric binder and extractable plasticizer suitable for forming a bound porous composite having a molecular weight of from about 1k to 5,000k. Examples of suitable polymeric binders include EPDM (ethylene propylene diamine termonomer), PVDF (polyvinylidene difluoride), HFP (hexafluoropropylene), EAA (ethylene acrylic acid copolymer), EVA (ethylene vinyl acetate copolymer), EAA/EVA copolymers, and copolymers of PVDF and HFP and the like. In one preferred embodiment, the carbon intercalation anode precursor (that is, the anode structure prior extraction) comprises from about 40 to about 70 weight percent of a carbon material (e.g., graphite); from about 8 to about 20 weight percent of a polymeric binder; and from about 15 to about 40 weight percent plasticizer. The anode may also include an electron conducting material such as carbon black.

For the present invention, the anode active material comprises graphite or coke. While both natural and synthetic graphites may be employed, synthetic graphites that are highly structured, highly crystalline, anisotropic graphites having a nearly perfect layered structure are preferred. They are preferably formed by heat treatment up to about 3000° C. Examples are the SFG™ and KS™ series of synthetic graphites supplied by Lonza G. & T., Limited (Sins, Switzerland). Although other anode materials may be used in addition to graphite or coke, in preferred embodiments, the anode active material consists essentially of graphite, coke, or a mixture thereof. Preferred cokes include, for example, those available as MCMB $_{2510}$™ from Osaka Gas Co., Japan (BET surface area 0.92 m²/g, density 2.0 g/cm³, and particle size < 25 µm) and MGC™ (density 1.6 g/cm³ and particle size<17 µm) from Mitsubishi Gas Co., Japan.

Electrochemical cells employing the inventive anode and an electrolytic solvent comprising propylene carbonate and 4,5 dichloroethylene carbonate are expected to maintain a high reversible specific capacity and demonstrate minimal first cycle capacity loss, heretofore unexpected and surprising in view of difficulties posed by graphite anodes operating in the presence of propylene carbonate. Specifically, the electrochemical cell or battery is expected to exhibit a first cycle capacity loss of less than about 35% and which will be characterized by an anode having a reversible capacity of greater than about 300 milliamp hours per gram (mAh/g).

Examples of preferred synthetic graphites include those that are designated as SFG-6™, SFG-10™, and SFG-15™, KS-15™, and BG-35™. BG-35™ is available from Superior Graphite Co., Chicago, Ill. The features of the specific graphites are included in Table 1 along with comparative data for other graphites tested.

TABLE I

| Graphite | Surface Area (m²/g) (BET) | Coherence Length L_c (nm) | Density (g/cm³)² | Particle Size¹ | Median Size d₅₀ (μm) | Interlayer Distance c/2 (nm) |
|---|---|---|---|---|---|---|
| SFG-6 | 15.2 | >100 | 2.26 | <6 | 3.2 | 0.3355 |
| SFG-10 | 11.1 | >150 | 2.26 | <12 | 5.8 | 0.3355 |
| SFG-15 | 8.8 | >120 | 2.26 | <16 | 8.1 | 0.3355 |
| SFG-44 | 4.2 | <200 | 2.26 | <48 | 22 | 0.3355 |
| KS-10 | 16 | 80 | 2.255 | <12 | 5.9 | 0.3357 |
| KS-15 | 14 | 90 | 2.255 | <16 | 7.7 | 0.3356 |
| KS-25 | 13 | 90 | 2.255 | <24 | 10.5 | 0.3356 |
| BG-35 | 7 | >1000 | 0.195 | <36 | 17 | N/A |
| F-399 | 23 | >1000 | 2.20 | <35 | 16 | N/A |

¹Maximum size for at least 90% by weight of graphite particles, interpolated for F-399 based on 87% less than 31 microns (μm), and 96% less than 44 micron (μm).
²In xylene.

The cathode typically comprises a cathodic material or cathode active material (i.e., insertion compound) which is any material which functions as a positive pole in a solid electrolytic cell. Such cathodic materials are well known in the art and include, by way of example, transition metal oxides, sulfides, and selenides, including lithiated compounds thereof. Representative cathodic materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_yNiO_2$ and $Li_xCoO_2$ wherein $0<x\leq2$. Blends can also include $Li_y$—α—$MnO_2$ ($0\leq y<1$) which has a hollandite-type structure. $Li_y$—α—$MnO_2$ where $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation (also referred to as "prelithiation"of $\alpha MnO_2$ can be accomplished via a solid state reaction:

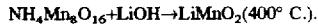

$NH_4Mn_8O_{16}+LiOH \rightarrow LiMnO_2(400° C.)$.

Li—α—$MnO_2$ retains the same structure as Hollandite. See, Botkovitz et. al., J. of Power Sources, 43–44 (1993) 657–665, which is incorporated herein, for a discussion of the structure and electrochemical characteristics of Li—α—$MnO_2$. $Li_y$—α—$MnO_2$ $0\leq y<0.5$ is commercially available from SEDEMA, Tertre, Belgium.

In one preferred embodiment, the cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1k to 5,000k.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, copolymers of PVDF an d HFP, and the like; from about 0 to about 20 weight percent of polyethylene oxide having a number average molecular weight of at least 100,000; from about 10 to 50 weight percent of electrolyte solvent; and from about 5 weight percent to about 25 weight of a solid matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100k. Preferably, the film forming agent is employed in an amount of about 1 to about 10 weight percent and more preferably at about 2.5 weight percent based on the total weight of the electrolyte composition.

METHODOLOGY

Methods of fabricating electrochemical cells are known in the art. See, for example, U.S. Pat. Nos. 5,300,373, 5,316, 556, 5,346,385, 5,262,253, 4,472,487, 4,668,595, and 5,028, 500, all of which are incorporated herein. The following illustrates a method of how an electrolytic cell could be fabricated with using the inventive electrolyte solvent mixtures. Examples 1 and 2 describe the process of preparing the anode and cathode, respectively. Example 3 describes the procedures for assembly a solid electrolytic cell.

The anode generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm.

Similarly, the cathode of the present invention generally comprises a cathode film that is laminated onto one or both sides of the cathode current collector which is a thin metal foil or grid. Typically, each cathode film is from about 100 μm to about 200 μm in thickness; preferably about 130 μm to about 175 μm, and more preferably about 140 μm to about 165 μm.

Current collectors for the anode and cathode can comprise, for example, a screen, grid, expanded metal, woven or non-woven or knitted wire fabric formed from an electron conductive material such as metals or alloys.

Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 μm thick. It is available under the designation 2Cu5-125 (flatten) from Delker Corp., Branford, Conn. The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite SFG-15™ into a solution containing 60 grams acetone, and 10.5 grams dibutyl phthalate. The graphite was vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker Corp. The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by mixing 28.9 grams of $LiMn_2O_4$, 2.4 grams of carbon black (Super P™) into a solution containing 60 grams acetone, and 8.7 grams dibutyl phthalate. The mixture was then vigorously mixed in the a high shear mixer until a substantially homogeneous blend was formed. As further described below, the amount of cathode-active material $LiMn_2O_4$ employed can be varied to provide different cathode to anode mass ratios.

The cathode slurry was prepared by mixing the polymer mixture and the cathode mixture together under low shear conditions to form the cathode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} \cong 1.0.$$

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation with the inventive solvent mixture and lithium salt preferably occurs in an inert (e.g., argon) atmosphere. Finally, the packaging of the electrochemical cell is sealed.

EXAMPLE 4

Another preferred method of preparing anode films is as follows:

A polyvinylidenedifluoride (PVDF) solution was prepared by mixing 300 grams of 120,000 MW PVDF (PolyScience) in 300 ml of dimethyl formamide. The mixture was stirred for 2–3 hours with a magnetic stirrer to dissolve all of the PVDF. The PVDF functions as a binder for the graphite in the anode.

Next, a PVDF/graphite slurry was prepared by first adding 36 grams of graphite (SFG-15) into about 38.5 grams of the PVDF solution. The mixture was homogenized with commercial homogenizer or blender. (For example, Tissue Homogenizer System form Cole-Parmer Instrument Co., Niles, Ill.). The viscosity of the slurry was adjusted to about 200 cp with additional PVDF solution.

The slurry was coated onto a bare copper foil by standard solvent casting techniques, such as by doctor blade type coating. Alternatively, the slurry can be coated onto a copper foil having a polymeric adhesion promoter layer. In preparing the slurry, it is not necessary to grind or dry the graphite, nor is it necessary to add conductive carbon black to the graphite anode formulation. The anode is dried at approximately 50° C. for about 10 hours to remove residual water.

EXPERIMENTAL

Performance of Half Cells

Lithium metal/graphite half cells were build by positioning a glass fiber separator between the electrodes. The carbon electrode active surface was about $^{11}/_{16}$ inch (1.75 cm) in diameter. The cell was carbon electrode limited. The liquid electrolyte comprised an organic solvent mixture of 50% (wt) DCEC and 50% (wt) PC and the inorganic salt was $LiPF_6$ (1M).

Performance

In one half cell, the graphite in the carbon electrode was SFG-15™. The charge current was 0.2 mA/cm² and the discharge current was 0.2 mA/cm². The voltage limits were 2 and 0.01 volts. FIG. 1 is the graph of cell voltage vs. capacity for this cell for one cycle. The measured first capacity loss was 25.6% and the reversible anode specific capacity was 351 mAh/g.

In the second half cell, the graphite in the carbon electrode was KS-15™. The charge/discharge currents and the voltage limits were the same was above. FIG. 2 is the graph of cell voltage vs. capacity for this cell for two cycles. The measured first capacity loss was 31.7% and the reversible anode specific capacity was 328 mAh/g.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An electrochemical cell comprising:
    an anode comprising a carbon anode active material comprising graphite, coke, or mixtures thereof, and a binder;
    a cathode; and
    an electrolyte, that is interposed between the anode and cathode, that comprises a salt and a solvent mixture comprising about a 20:80 to 80:20 weight ratio of propylene carbonate and 4,5-dichloroethylene carbonate.

2. The electrochemical cell of claim 1 characterized by a first cycle capacity loss of less than about 35 percent and said anode further characterized by a reversible capacity of greater than about 300 mAh/g.

3. The electrochemical cell of claim 1 wherein the solvent mixture has a melting point of less than about −30° C.

4. The electrochemical cell of claim 2 wherein the solvent mixture has a melting point of less than about −30° C.

5. The electrochemical cell of claim 1 wherein the weight ratio is about 20 to 80.

6. The electrochemical cell of claim 3 wherein the weight ratio is about 20 to 80.

7. The electrochemical cell of claim 1 wherein the electrolyte further comprises a polymeric matrix.

8. The electrochemical cell of claim 2 wherein the electrolyte further comprises a polymeric matrix.

9. The electrochemical cell of claim 1 wherein said salt comprises $LiPF_6$.

10. The electrochemical cell of claim 2 wherein said salt comprises $LiPF_6$.

11. The electrochemical cell of claim 1 wherein the solvent mixture consists essentially of propylene carbonate and 4,5-dichloroethylene carbonate.

12. The electrochemical cell of claim 1 wherein the carbon anode active material is graphite.

13. The electrochemical cell of claim 11 wherein the carbon anode active material is graphite.

14. The electrochemical cell of claim 1 wherein said carbon anode active material consists essentially of graphite that has an interlayer distance spacing of 002 planes ($d_{002}$) as determined by x-ray diffraction of about 0.335 nm to 0.336 nm, a crystalline size in the direction of c-axis ($L_c$) being greater than about 90 nm and less than about 1000 nm, a BET surface area of greater than about 5 m²/g, and up to about 25 m²/g.

15. The electrochemical cell of claim 11 wherein said carbon anode active material consists essentially of graphite that has an interlayer distance spacing of 002 planes ($d_{002}$) as determined by x-ray diffraction of about 0.335 nm to 0.336 nm, a crystalline size in the direction of c-axis ($L_c$) being greater than about 90 mn and less than about 1000 nm, a BET surface area of greater than about 5 m²/g, and up to about 25 m²/g.

16. The electrochemical cell of claim 1 wherein the solvent mixture comprises one or more solvents selected form the group consisting of ethylene carbonate, methyl ethyl carbonate, dimethyl carbonate, dipropyl carbonate, diethyl carbonate, and butylene carbonate.

17. A method of fabricating an electrochemical cell comprising the steps of:
    (a) providing an anode comprising graphite, coke, or mixtures thereof, and a binder;
    (b) providing a cathode; and
    (c) forming an electrolyte containing a salt and a solvent mixture that is interposed between said anode and said cathode wherein the solvent mixture comprising about a 20:80 to 80:20 weight ratio of propylene carbonate and 4,5-dichloroethylene carbonate.

18. The method of claim 17 wherein the cell is characterized by a first cycle capacity loss of less than about 35 percent and said anode further characterized by a reversible capacity of greater than about 300 mAh/g.

19. The method of claim 17 wherein the solvent mixture has a melting point of less than about −30° C.

20. The method of claim 18 wherein the solvent mixture has a melting point of less than about −30° C.

21. The method of claim 17 wherein the weight ratio is about 20 to 80.

22. The method of claim 19 wherein the weight ratio is about 20 to 80.

23. The method of claim 17 wherein the electrolyte further comprises a polymeric matrix.

24. The method of claim 18 wherein the electrolyte further comprises a polymeric matrix.

25. The method of claim 17 wherein said salt comprises $LiPF_6$.

26. The method of claim 18 wherein said salt comprises $LiPF_6$.

27. The method of claim 17 wherein the solvent mixture consists essentially of propylene carbonate and 4,5-dichloroethylene carbonate.

28. The method of claim 17 wherein the carbon anode active material is graphite.

29. The method of claim 27 wherein the carbon anode active material is graphite.

30. The method of claim 17 wherein said carbon anode active material consists essentially of graphite that has an interlayer distance spacing of 002 planes ($d_{002}$) as determined by x-ray diffraction of about 0.335 nm to 0.336 nm, a crystalline size in the direction of c-axis ($L_c$) being greater than about 90 nm and less than about 1000 nm, a BET surface area of greater than about 5 $m^2/g$, and up to about 25 $m^2/g$.

31. The method of claim 27 wherein said carbon anode active material consists essentially of graphite that has an interlayer distance spacing of 002 planes ($d_{002}$) as determined by x-ray diffraction of about 0.335 to 0.336 nm, a crystalline size in the direction of c-axis ($L_c$) being greater than about 90 nm and less than about 1000 nm, a BET surface area of grater than about 5 $m^2/g$, and up to about 25 $m^2/g$.

32. The method of claim 17 wherein the solvent mixture comprises one or more solvents selected form the group consisting of ethylene carbonate, methyl ethyl carbonate, dimethyl carbonate, dipropyl carbonate, diethyl carbonate, and butylene carbonate.

\* \* \* \* \*

UNITED STATES PATENT AND TRADEMARK OFFICE
CERTIFICATE OF CORRRECTION

PATENT NO. : 5,780,182
DATED : July 14, 1998
INVENTOR(S) : Barker et al.

It is certified that error appears in the above-identified patent and that said Letters Patent is hereby corrected as shown below:

On the title page, item [56] insert the following

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 5 | 4 | 1 | 0 | 2 | 0 | 7/30/96 | Golovin et al. | | | |
| | | | | | | | | | | | | | |

OTHER DOCUMENTS

| | | |
|---|---|---|
| | Patent Abstracts of Japan, vol. 018, no. 139 (E-1519), 8 March 1994, JP 05 325985 A, | |
| | 10 December 1993. | |
| | Patent Abstracts of Japanese vol. 096, no. 009, 30 September 1996, JP 08 115742 A, | |
| | 7 May 1996. | |

Signed and Sealed this

Sixteenth Day of March, 1999

Attest:

Q. TODD DICKINSON

*Attesting Officer*  *Acting Commissioner of Patents and Trademarks*